United States Patent [19]
Kleles

[11] Patent Number: 5,236,001
[45] Date of Patent: Aug. 17, 1993

[54] DUAL FLUID REMOTE CONTROL VALVE

[76] Inventor: Thomas Kleles, P.O. Box 1561, Tarpon Springs, Fla. 34688

[21] Appl. No.: 811,037

[22] Filed: Dec. 20, 1991

[51] Int. Cl.$^5$ ............... F16K 11/07; F16K 31/122
[52] U.S. Cl. .................................. 137/87; 137/625.66
[58] Field of Search .............. 137/87, 111, 114, 88, 137/625.66

[56] References Cited

U.S. PATENT DOCUMENTS

| | | | |
|---|---|---|---|
| 3,82,678 | 5/1975 | Fassbender | 137/114 X |
| 1,257,070 | 2/1918 | Discher | 137/87 X |
| 2,682,883 | 7/1954 | Phillips | 137/111 |
| 3,099,282 | 7/1963 | Miller et al. | 137/87 |
| 3,210,938 | 10/1905 | Mendez | 137/111 X |
| 3,292,651 | 12/1966 | Innocenti | 137/111 |
| 3,477,344 | 11/1969 | Fisher | 137/625.66 X |
| 3,612,086 | 10/1971 | Roth | 137/87 |
| 3,739,799 | 6/1973 | Bickford | 151/88 |
| 3,742,970 | 7/1973 | Gross | 137/100 |
| 4,328,823 | 5/1982 | Schreiber | 137/88 |
| 4,716,923 | 1/1988 | West | 137/625.19 X |

Primary Examiner—Gerald A. Michalsky
Attorney, Agent, or Firm—Pettis & McDonald

[57] ABSTRACT

The remote control valve has connected to it an oxygen supply, an air supply, an underwater oxygen-arc cutting torch and an air cylinder that operates a knife switch. When the oxygen valve on the underwater oxygen-arc cutting torch is depressed the oxygen flows through the front body orifices and out through the oxygen outlet port to the underwater oxygen-arc cutting torch at the required pressure and volume. Also as the oxygen flows through the front body it shifts the piston and spool valve to the open position and the spool valve directs the air pressure from the air inlet port to the air outlet port which extends the air cylinder and closes the knife switch. When the oxygen valve on the underwater oxygen-arc cutting torch is released the oxygen flow stops and the spool valve and piston are shifted to the closed (exhaust) position by the compression spring and the air cylinder is exhausted out through the air exhaust port which opens the knife switch.

8 Claims, 4 Drawing Sheets

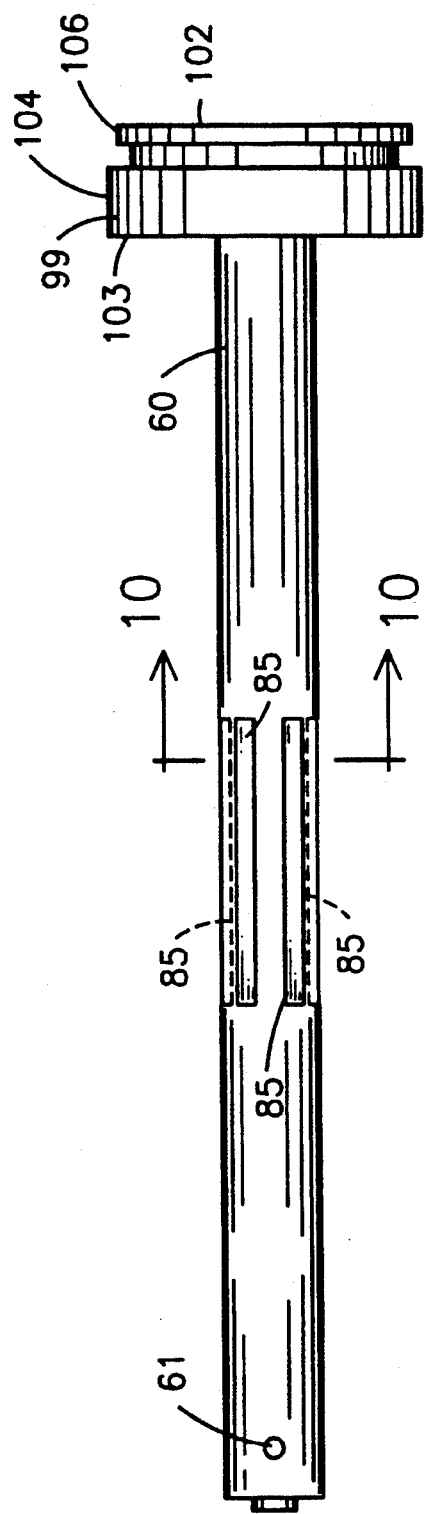
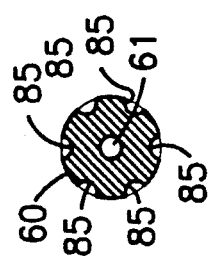
Fig. 9
Fig. 10

DUAL FLUID REMOTE CONTROL VALVE

This application for a patent relates to the disclosure U.S. Ser. No. 282,029 dated Feb. 25, 1991.

BACKGROUND AND SUMMARY OF INVENTION

This invention relates to underwater oxygen-arc cutting systems.

One problem which faces divers when cutting underwater with an oxygen-arc cutting system is that they themselves can not control the knife switch that provides the electrical current to the underwater oxygen-arc cutting torch. It is controlled by personnel on the surface on the divers command via the communication system between the surface and the diver.

At times a diver is required to do cutting next to high pressure gas and oil lines of large diameter. If the diver were to fall and the tip of the cutting rod made contact with the lines with the knife switch closed his life would most likely be lost as well as lives of personnel on the surface.

Another situation is when a diver falls and gets between the ground cable and cutting torch with the knife switch closed, this is very dangerous to his life.

A problem that faces the diving industry is that underwater oxygen-arc cutting systems are limited to the depths of water they can be used because of the length of the electric leads from the surface to the work place underwater.

It is desirable therefore that a self contained underwater oxygen-arc cutting system be provided for divers and underwater remote operated vehicles.

One type of oxygen-arc cutting rod which is an aid to underwater oxygen-arc cutting systems is an ultrathemic cutting rod that can be ignited underwater as follows, with the oxygen valve on the oxygen-arc torch depressed the cutting rod is dragged across a striker plate that is attached to the ground cable. This process starts the cutting rod burning and it will continue to burn until the oxygen valve on the oxygen-arc torch is released. The ultrathemic cutting rod can be ignited by the electrical current from a welding machine, a 12 volt or 24 volt car or boat battery. The company that sells the ultrathemic cutting rods recommends using a knife switch with their system.

An object of this invention is to eliminate the above mentioned disadvantages associated with underwater oxygen-arc cutting by providing a remote control valve that makes it possible to provide a self contained underwater oxygen-arc cutting system for divers and underwater remote operated vehicles.

A further object of this invention is to provide the means to use two different fluids at different pressures.

Still another object of this invention is to provide a valve that can be used underwater at any depth.

Still another object of this invention is to provide a valve that can be used underwater or above water.

For accomplishing these object a remote control valve according to the invention comprises a first fluid input port, a first fluid output port, a second fluid supply port, a second fluid output port, a normally closed two position spool valve with six grooves and a hollow center, for equalizing the pressure, and a piston, with an equalizing longitudinal passage therethrough, the piston being attached to the spool valve. The spool valve directs the fluid flow between the three ports in the center body.

The dual fluid remote control valve may be used for many purposes. One example is the previously mentioned oxygen-arc cutting system. In this system, the oxygen supply to the oxygen-arc cutting torch is connected to the first fluid inlet port at one end of the body and exits out through the first fluid outlet port of the body to the oxygen-arc cutting torch. The remote control valve may be operated with an oxygen-arc cutting system. After an air supply is connected to the second fluid supply port in the center body and the oxygen supply has been connected to the remote control valve and the oxygen valve on the oxygen-arc cutting torch is depressed, the oxygen flow moves spool valve longitudinally to the open position which permits the air flow to an air actuated electrical switch permitting electricity to flow to the cutting torch. The oxygen continues to flow through the first fluid input port of the front body to the first fluid outlet port of the center body to the oxygen-arc cutting torch and cutting rod. When the oxygen valve on the oxygen-arc cutting torch is released, the oxygen flow stops and the spool valve is returned to the closed position cutting off the flow of air to the air actuated switch and thus cutting off the electricity to the torch.

The features and advantages of the invention, as well as additional objects thereof will be understood more fully from the following description when read in connection with the accompanying drawings.

FIG. 1. Is a perspective view of the remote control valve according to the preferred embodiment of the invention.

FIG. 2. Is a rear elevation view of the remote control valve of FIG. 1.

FIG. 3. Is an enlarged perspective view of the preferred embodiment front body portion of the invention.

FIG. 4. Is a front elevation view of the center body portion taken along line 4—4, of FIG. 8.

FIG. 5. Is a front elevation view of the back body portion taken along line 5—5 of FIG. 8.

FIG. 6. Is a side elevation view of the front body portion as shown in FIG. 3.

FIG. 7. Is a right end view of the spool valve removed from control valve.

FIG. 8. Is a cross sectional taken along line 8—8 of FIG. 1 view of the remote control valve.

FIG. 9. Is a top plan view of the spool valve and piston, removed from the valve body.

FIG. 10. Is a cross sectional view of the spool valve taken along line 10—10 in FIG. 9, illustrating the grooves.

DETAILED DESCRIPTION

FIGS. 1 through 10 illustrate the preferred embodiment of the remote control valve.

Figure 1:
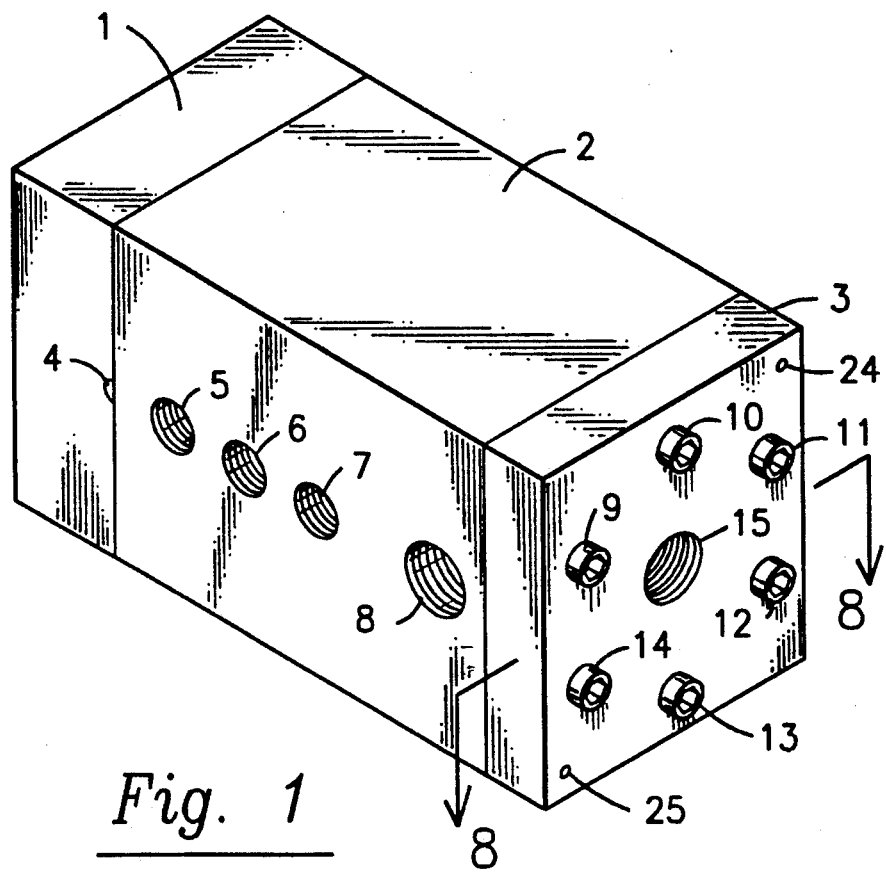

FIG. 1 shown the valve assembled with the back body portion 1, the portion 2, the portion 3, the 6 socket cap screws 9, 10, 11, 12, 13, 14, the 2 dowel pin holes 24, 25, vent 4, second fluid port 5, the second fluid outlet port 6, the second fluid exhaust port 7, (typically air is used as a second fluid in the preferred embodiment, therefor air supply port, air outlet port and air exhaust port will be used hence-forth) the first fluid outlet port 8, the first fluid inlet port 15. (typically oxygen is used as the first fluid in the preferred embodiment for use with an oxygen-arc cutting torch, therefore, oxygen outlet port and oxygen inlet port will be used henceforth).

Figure 2:
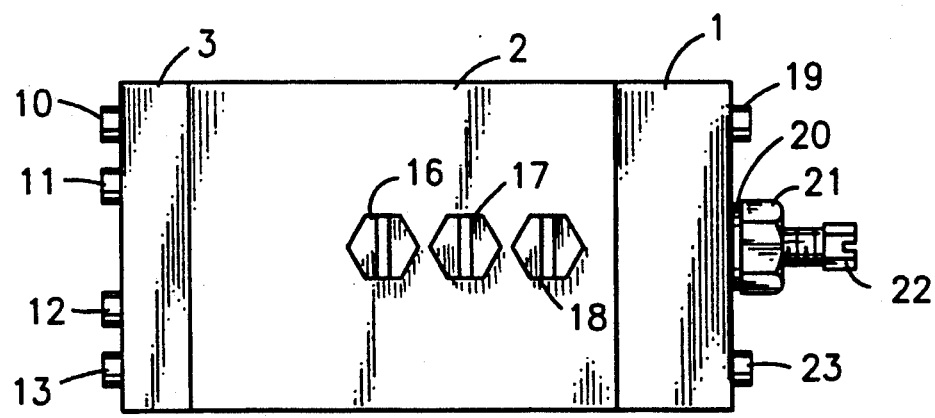

FIG. 2 shows the valve assembled with the back body 1, the center body 2, the front body 3, 4 socket cap screws 10, 11, 12, 13, 3 seal screws 16, 17, 18, 2 socket cap screws 19, 23, tetrafluoroethylene washer 20, the sealing hex nut 21, and adjusting screw 22.

Figure 3:
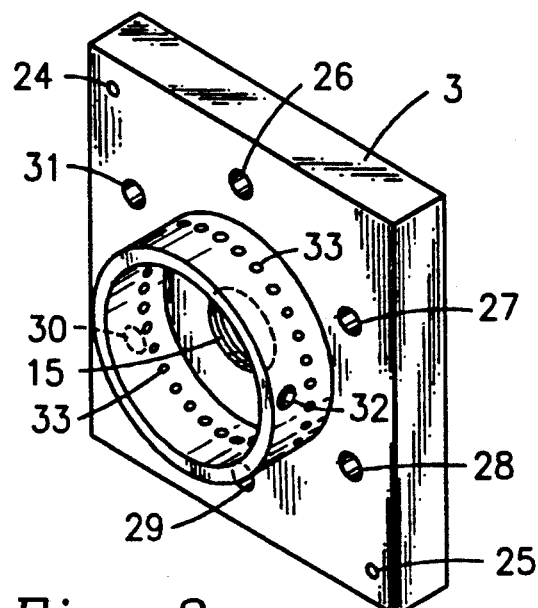

FIG. 3 shows the inside of the front body 3, the 2 dowel pin holes 24, 25, the 6 socket cap screw holes 26, 27, 28, 29, 30, 31, the oxygen inlet port 15, oxygen outlet orifices 33, inspection hole 32.

Figure 4:
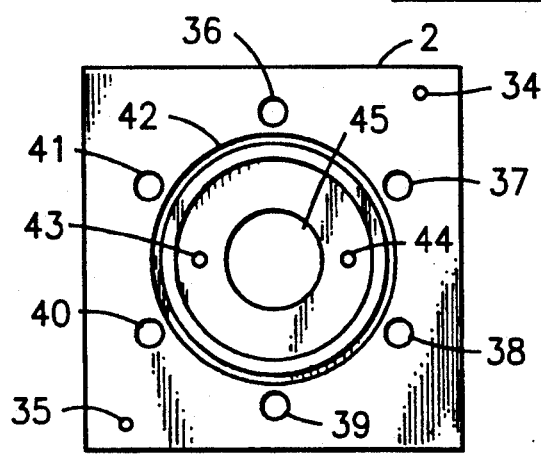

FIG. 4 shows the front end of the center body 2, the 2 dowel pin holes 34, 35, the 6 tapped holes 36, 37, 38, 39, 40, 41, O'ring groove 42, the 2 tapped holes 43, 44, bore of the center body 45.

Figure 5:
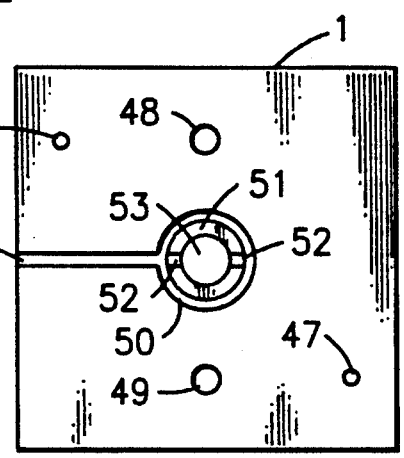

FIG. 5 shown the front end of the back body 1, the 2 dowel pin holes 46, 47, the 2 socket screw holes 48, 49, the recess for the seal retainer 50, the recess for U cup seal 51, the grooves 52, and the bore of the rear body 53.

Figure 6:
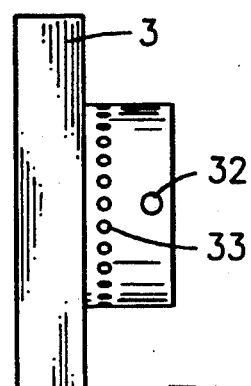

FIG. 6 shows the side of the front body 3, the oxygen outlet orifices 33, the inspection port 32.

Figure 7:
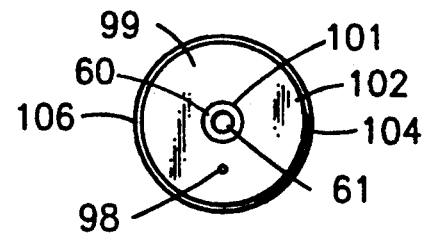

FIG. 7 shows the extension end surfaces 102 and extension surface 103 of the enlarged portion, conveniently a threadably attached piston 99 of the spool valve 60 and the end surface 101 of the spool valve 60, the passage 98, the spool valve 60, the equalizing channel 61.

Figure 8:
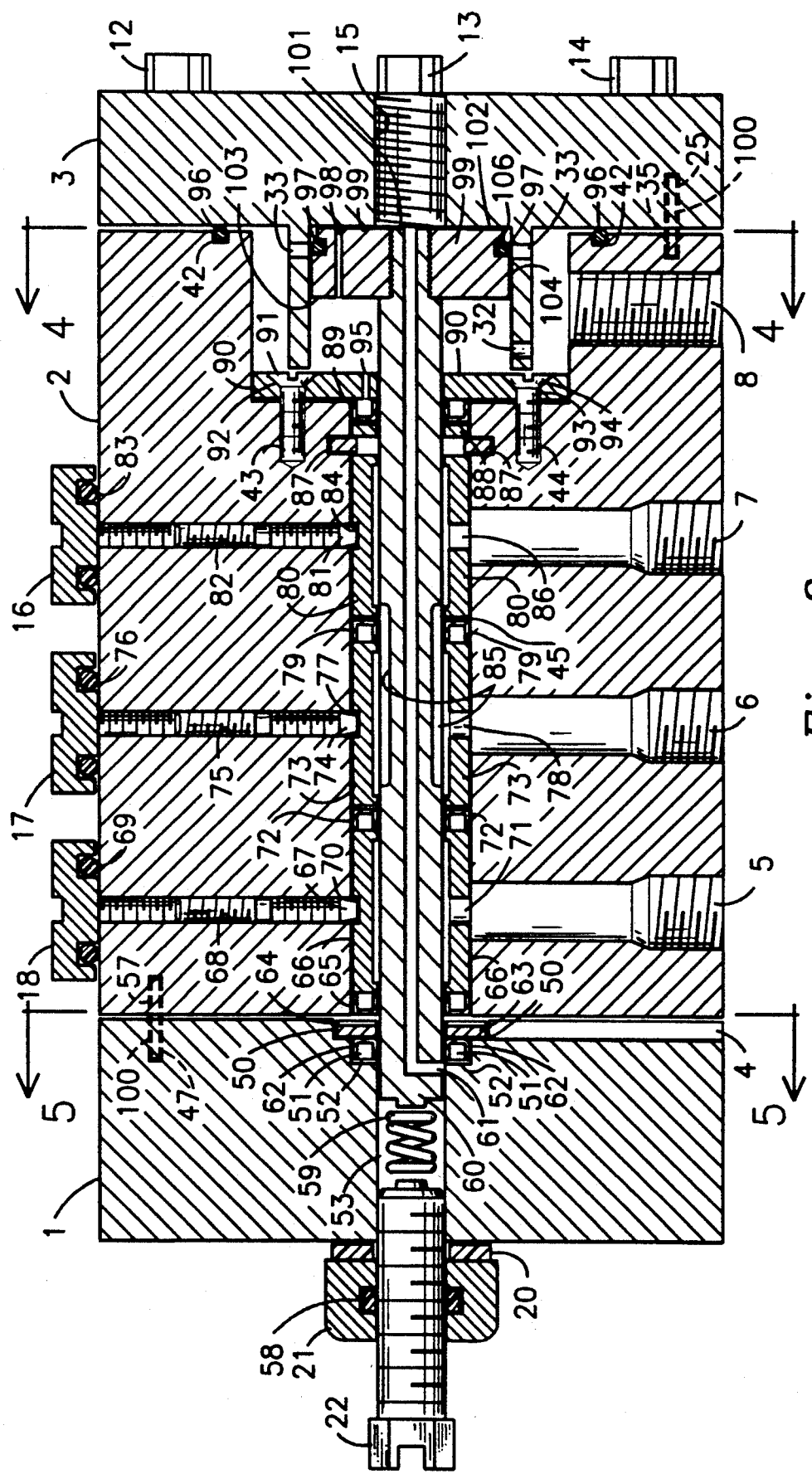

FIG. 8 shows a cross section of the remote control valve. The back body 1, the center body 2, the front body 3, the vent 4, the air supply port 5, air outlet port 6, air exhaust port 7, the oxygen outlet port 8, socket cap screws 12, 13, 14, the oxygen inlet port 15, seal screws 16, 17, 18, washer 20 (constructed of tetrafluoroethylene), sealing hex nut 21, adjusting screw 22, inspection hole 32, oxygen outlet orifices 33, the O'ring groove 42, tapped hole 43, tapped hole 44, bore of center body 45, recess for seal retainer 50, the recess for U cup seal 51, grooves 52, bore of rear body 53, seal 58 (constructed of tetrafluoroethylene), biasing means compression spring 59, spool valve 60, equalizing channel 61, U cup seal 62, seal retainer 63, grooves in seal retainer 64, U cup seal 65, spacer 66, set screw 67, tapped hole 68 to the bore of the center body 2; seal screw O'ring 69, recess 70, air supply hole 71, the U cup seal 72, the spacer 73, the set screw 74, the tapped hole 75 to the bore of the center body 2, the seal screw O'ring 76, recess 77, air outlet hole 78, U cup seal 79, the spacer 80, set screw 81, tapped hole 82 to the bore of the center body 82, seal screw O'ring 83, recess 84, grooves 85 in spool valve 60, air exhaust hole 86, retainer ring 87, seal seat 88, U cup seal 89, seal retainer 90, screw 91, screw hole 92, screw hole 93, screw 94, hole 95, O'ring 96, O'ring 97, passage 98, piston 99.

TO ASSEMBLE THE VALVE

Referring to FIG. 8, the spacer 66 is inserted into the center bore 45, of the center body 22 and the air supply hole 71 is centered in the air supply port 5, the set screw 67 is screwed down through the tapped hole 68, and locks the spacer 66 in place, the seal screw 18 with the O'ring 69 is screwed down in place. The U cup seal 72 is inserted into place with the sealing lips facing the spacer 66. The spacer 73 is inserted into the center bore 45, and the air outlet hole 78 is centered in the air outlet port 6. The set screw 74 is screwed down through the tapped hole 75 and locks the spacer 73 in place. The seal screw 17 with the O'ring 76 is screwed down in place, the U cup seal 79 is inserted into place with the sealing lips facing the spacer 73. The spacer 80 is inserted into the center bore 45, the air exhaust hole 86 is centered in the air exhaust port 7, the set screw 81 is screwed down through the tapped hole 82 and locks the spacer 80 in place. The retainer ring 87 is compressed and installed in the machined area of the bore of the center body 45, the seal seat 88 is placed on top of the retainer ring 87, the U cup seal 89 is inserted into place with the sealing lips away from the seal seat, and the seal retainer 90 is installed and secured in place with the two screws 91, 94. The U cup seal 65 is inserted in place with the sealing lips facing the spacer 66.

The back body 1, the adjusting screw 22 with the sealing hex nut 21 and the washer 20 is screwed into the bore 53 of the rear body 1, the compression spring 59, is then inserted into the bore of the rear body 1 from the opposite end. The U cup seal 62 is inserted in place with the sealing lips toward the compression spring 59. The seal retainer 63 is installed with the grooves 64 to the outside.

The center body 2 and the back body 1 are joined together, being centered by dowel pins 100 that are in the dowel pin holes 46 (not shown) and 47 of the back body 1 and in the dowel pin holes 56 and 57 of the center body 2, and bolted together with the two socket cap screws 19 and 23, which is best shown in FIG. 2.

The piston 99 is screwed down onto the spool valve 60 and the O'ring 97 is installed on the piston 99. The spool valve 60 and the piston 99 is pushed down and rotated through the center of the center body 2 from the front until it rests on the compression spring 59 in the back body 1.

The center body 2, FIG. 4 with the O'ring 96 installed in the O'ring groove 42 and the front body 3, are joined together and centered with the two dowel pins 100 that are in the dowel pin holes 34 (not shown) and 35 of the center body 2 and in the dowel pin holes 24 (not shown) and 25 of the front body 3 and bolted together with the six socket cap screws 9, 10, 11, 12, 13 and 14 which is best shown in FIG. 1.

The adjusting screw 22 is screwed in until the compression spring 59 is seated on the adjusting screw 22 and the spool valve 60, and then the sealing hex nut 21 is tightened. A stiff plastic rod is then inserted through the oxygen inlet port 15 and pushed down to depress the piston 99 and the spool valve 60 to check the operation of the piston 99 and the spool valve 60. By looking through the oxygen outlet port 8 and the inspection port 32 you can see the operation of the spool valve 60 and the piston 99.

OPERATION

Having thus set forth a preferred construction for the dual fluid remote control valve of this invention, it is to be remembered that this is but a preferred embodiment. Attention is now invited to one use of the remote control valve, in conjunction with an underwater oxygen-arc cutting torch, which is not shown or claimed. The remote control valve has many additional uses.

Referring to FIG. 8, a regulated oxygen supply is connected to the oxygen inlet port 15, the underwater oxygen-arc cutting torch oxygen hose is connected to the oxygen outlet port 8, a regulated air supply is connected to the air supply port 5, the air hose from the air cylinder that operate an electrical knife switch is connected to the air outlet port 6.

When the remote control valve is pressurized with the regulated oxygen supply that is connected to the oxygen inlet port 15, the oxygen flows through the equalizing hole 61 of the spool valve 60 into the bore of the back body 53 which equalizes the oxygen pressure in the back body 1 with that of the center body 2 and the front body 3. The U cup seal 62 prevents the oxygen from escaping to the front of the back body 1 and out through the vent 4, by making a seal around the circumference of the spool valve 60 and by also making a seal around the outside circumference of the recess for U cup seal 51. The washer 20 and the sealing hex nut 21, which includes the seal 58, prevents the oxygen from escaping around the adjusting screw 22. The oxygen also flows through the passage 98 of the piston 99 to equalize the pressure on both sides of the piston 99, through the hole 95 of the seal retainer 90 to better equalize the pressure on both side of the seal retainer 90 and through the center hole of the seal retainer 90. The U cup seal 89 prevents the oxygen from escaping through the air exhaust port 7 by making a seal around the circumference of the spool valve 60 and by also making a seal around the circumference of the bore of the center body 45. The O'ring 96 prevents the oxygen from escaping between the center body 2 and the front body 3. The oxygen flows out between the seal retainer 90 and the bottom portion of the front body 3 and through the inspection port 32 to the oxygen outlet port 8 and through the oxygen hose to the underwater oxygen-arc cutting torch that is connected to the oxygen outlet port 8 to pressurize this part of the system.

If the remote control valve is pressurized rapidly with the oxygen supply to the oxygen inlet port 15 the spool valve will cycle and the oxygen will flow through the oxygen outlet orifices 33 to the oxygen outlet port 8 to the underwater oxygen-arc cutting torch.

When the remote control valve is pressurized with the regulated air supply that is connected to the air supply port 5, the air flows through the air supply hole 71. The U cup seal 65 prevents the air from escaping to the back of the center body 2 and out through the vent 4 by making a seal around the circumference of the spool valve 60 and by also making a seal around the circumference of the bore of the center body 45. The U cup seal 72 prevents the air from escaping to the air outlet hole 78 and out through the air outlet port 6 by making a seal around the circumference of the spool valve 60 and by also making a seal around the circumference of the bore of the center body 45.

When the oxygen valve on the underwater oxygen-arc cutting torch is depressed it causes the oxygen to flow through the remote control valve to the underwater oxygen-arc cutting torch shifting the piston 99 and the spool valve 60 to the open position. The oxygen flow moves the piston 99 and the spool valve 60 to the open position. The oxygen flow passes through the oxygen outlet orifices 33 to the oxygen outlet port 8 to the underwater oxygen-arc cutting torch and cutting rod.

The six grooves 85 in the spool valve 60 allow the air pressure from the air supply port 5 and the air supply hole 71 to bypass U cup seal 72 and continue out through the air outlet hole 78 and the air outlet port 6 to an air cylinder (not shown) that operates the knife switch (not shown). The U cup seal 79 prevents the air pressure from escaping to the air exhaust hole 86 and the air exhaust port 7. The operation of the knife switch permits electricity to flow to the cutting torch.

When the oxygen valve on the underwater oxygen-arc cutting torch is released the oxygen flow stops and the spool valve 60 and the and the piston 99 are shifted to the closed position by the compression spring 59. The 6 grooves 85 in the spool valve 60 allow the air from the air cylinder to exhaust back through the air outlet port 6, through the air outlet hole 78 through the grooves 85, bypassing the U cup seal 79 and continuing out through the air exhaust hole 86 and the air outlet port 7. The U cup seal 72 prevents the air from escaping to the air outlet hole 78.

The adjusting screw 22 is adjusted to give the best response time for the spool valve 60 according to the oxygen pressure used. Generally the oxygen pressure at the cutting tip of the rod is 90 P.S.I. over the bottom pressure of the water.

The air pressure used with the remote control valve is 15 P.S.I. to 25 P.S.I. over the bottom pressure of the water.

The vent 4 is to vent oxygen and or air from the remote control valve. If the U cup seal 62 were to leak because of wear or damage the oxygen pressure would be vented out through vent 4 otherwise it would be forced passed the U cup seal 65 into the air supply and malfunction the remote control valve. If the U cup seal 65 were to leak because of wear or damage the air pressure would be vented out through vent 4.

If the U cup seal 89 were to leak because of wear or damage the oxygen pressure would vent out through the air exhaust hole 86 to the air exhaust port 7.

The grooves 52 in the back body 1 and the grooves 64 in the seal retainer 63 will vent the oxygen pressure to vent 4 if the U cup 62 becomes worn or damaged.

The grooves 64 in the seal retainer 63 will vent the air pressure to vent 4 if the U cup seal 65 becomes worn or damaged.

The top gland of the piston 99, that is, peripheral edge 104 of the piston 99 adjacent the extension end surface 102 is relieved to form a recess 106 to allow the oxygen to start flowing through the orifices 33 sooner than a piston with the same top and bottom gland circumference. In the preferred embodiment, the end surface 101 of the spool valve 60 and the extension end surface 102 lie generally in the same plane.

The remote control valve can be mounted in a desired position by attaching a mount on the socket cap screws of the front and back body.

What has been described is a remote control valve that makes it possible to assemble a self contained underwater oxygen-arc cutting system that can be used in any depth of water by a diver or by a remote operated vehicle.

One way to assembly a self contained underwater oxygen-arc cutting system is to use two small cylinders of high pressure oxygen that are connected together to a first stage regulator that maintains the required pressure over bottom pressure. The regulated oxygen supply is connected to the remote control valve with a hose. The underwater oxygen-arc cutting torch is connected to the remote control valve. A small cylinder of high pressure air with a first stage regulator that maintains the required pressure over bottom pressure is connected to the remote control valve with a hose. The air line from the single acting spring return air cylinder that opens and closes the sealed pressure proof knife switch is connected to the remote control valve. The positive cable from the sealed pressure proof 24 volt battery is connected to one terminal of the knife switch. The underwater oxygen-arc cutting torch is connected to the other terminal of the knife switch. The ground cable from the battery is attached to what is to be cut or it can be attached to a striker plate that is used to ignite the cutting rod as previously mentioned.

This system could also be used by connecting a oxygen hose from the surface to the remote control valve. This would still eliminate the heavy electric leads that weight hundreds of pounds.

A check valve can be connected to the air exhaust port 7 to prevent water from entering the remote control valve.

When the diver is ready to start cutting he depresses the oxygen valve on the underwater oxygen-arc cutting torch. And to stop cutting he releases the oxygen valve on the underwater oxygen-arc cutting torch.

Another feature and advantage of the remote control valve according to the invention is that it can be used with a air-arc cutting torch that is used in all shipyards and most heavy metal fabrication shops. The air-arc cutting torch uses compressed air that blows out around a carbon rod and a welding machine to burn the rods. The work site is generally hundreds of feet away from the welding machine. The air-arc cutting torch and rod is always hot (current to it) at times the air-arc torch is laid down, if the rod were to make contact with any thing that is grounded it would burn. Also if the welding cable to the air-arc torch were to be cut by accident by something falling on it and it became grounded it would burn. This situation is very dangerous as there are always oxygen bottles, hoses and other gases being used. The remote control valve and an air operated knife switch will eliminate this dangerous situation.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention hereinafter described, and all statements of the scope of the invention which, as a matter of language, might be said to fall therebetween.

Now that the invention has been described,
What is claimed is:

1. A dual fluid remote control valve comprising:
a body having a cylindrical bore, an exterior, and a first fluid input port, a first fluid outlet port, a second fluid supply port, and a second fluid outlet port therein, each of said ports passing through said body providing fluid flow communication between said bore and said exterior of said body;
a cylindrical spool valve sized and configured to be received by said bore such that said spool valve is movable between an open position and a closed position, said spool valve having a first end, a first end surface and a second end, said spool valve defining said closed position when said first end surface is adjacent said first fluid input port, and said spool valve defining said open position when said first end surface is distant from said first fluid input port;
an extension extending radially outwardly from said first end of said spool valve, said extension having an extension end surface and an inner face, a portion of said bore adjacent said extension being enlarged such that it is sized and configured to receive said extension of said spool valve and permit movement of said spool valve between said open and said closed positions;
said body further comprising a front body part having a cylindrical wall extending inwardly therefrom spaced apart from said enlarged portion of said bore and sized and configured to receive said extension of said spool valve, a sealing means slidably sealing said extension of said spool valve to said wall, said first fluid input port passing through said front body part such that when the first fluid passes through said first fluid input port, the first fluid directly impinges said first end surface of said spool valve;
a plurality of sealing means interposed between said spool valve and said bore preventing fluid flow communication between any of said ports;
said spool valve further comprising bypass means such that when said spool valve is in said open position said bypass means bypasses said sealing means interposed between said first fluid input port and said first fluid output port and between said second fluid supply port and said second fluid output port such that said first fluid input port is in fluid flow communication with said first fluid output port and said second fluid supply port is in fluid flow communication with said second fluid output port;
a means for introducing a second fluid through said second fluid supply port into said bore; and
means for introducing a first fluid through said first fluid input port into said bore, such that introduction of the fluid moves said spool valve from said closed position to said open position, whereby the first fluid exits said body through said first fluid output port and the second fluid exits said body through said second fluid output port.

2. A valve as in claim 1, wherein said extension of said spool valve further comprises an extension end surface and a peripheral edge, said peripheral edge adjacent said extension end surface being relieved.

3. A valve as in claim 2 wherein said extension end surface and said end surface of said spool valve lie generally in the same plane.

4. A valve as in claim 1 wherein said spool valve further comprises a longitudinal exterior surface and wherein said bypass means comprises at least one longitudinal groove formed in said spool valve such that when said spool valve is in said open position said groove extends across said sealing means separating said second fluid supply port and said second fluid output port such that the second fluid passes from said second fluid supply port through said groove and out said second fluid output port, and said bypass means further comprising at least one orifice through said wall, such that in said open position the first fluid passes from said first fluid input port through said orifice and out said first fluid output port.

5. A valve as in claim 1 wherein said body comprises a fluid exhaust port extending in fluid flow communication between said bore and said exterior of said body, said fluid exhaust port being in fluid flow communication with said second fluid output port when said spool valve is in said closed position.

6. A valve as in claim 1 wherein said body further comprises a sealing means adjacent said second end of said spool valve, and a vent in fluid flow communication between said bore and said exterior of said body such that when said sealing means adjacent said second end of said spool valve fails, the first fluid will exit said body through said vent.

7. A dual fluid remote control valve comprising:
  a body having a cylindrical bore, an exterior, and a first fluid input port, a first fluid outlet port, a second fluid supply port, and a second fluid outlet port therein, each of said ports passing through said body providing fluid flow communication between said bore and said exterior of said body;
  a cylindrical spool valve sized and configured to be received by said bore such that said spool valve is movable between an open position and a closed position, said spool valve having a first end, a first end surface and a second end, said spool valve defining said closed position when said first end surface is adjacent said first fluid input port, and said spool valve defining said open position when said first end surface is distant from said first fluid input port;
  a longitudinal channel through said spool valve providing fluid flow communication between said first end surface of said spool valve to a point adjacent said second end of said spool valve by which the pressure within said bore is equalized when fluid is not flowing through said first fluid outlet port;
  an extension extending radially outwardly from said first end of said spool valve, said extension having an extension end surface and an inner face, a portion of said bore adjacent said extension being enlarged such that it is sized and configured to receive said extension of said spool valve and permit movement of said spool valve between said open and said closed positions;
  a longitudinal passage through said extension providing fluid flow communication between said extension end surface and said inner face by which the pressure within said enlarged portion of said bore is equalized when fluid is not flowing through said first fluid outlet port;
  a biasing means having a first end and a second end, said first end connected to said body and said second end engaging said second end of said spool valve such that said spool valve is urged to said closed position when the pressure within said body is equalized;
  a plurality of sealing means interposed between said spool valve and said bore preventing fluid flow communication between any of said ports;
  said spool valve further comprising bypass means such that when said spool valve is in said open position, said bypass means bypasses said sealing means interposed between said first fluid input port and said first fluid output port and between said second fluid supply port and said second fluid output port such that said first fluid input port is in fluid flow communication with said first fluid output port and said second fluid supply port is in fluid flow communication with said second fluid output port;
  a means for introducing a second fluid through said second fluid supply port into said bore; and
  a means for introducing a first fluid through said first fluid input port into said bore, such that introduction of the fluid moves said spool valve from said closed position to said open position, whereby the first fluid exits said body through said first fluid output port and the second fluid exits said body through said second fluid output port.

8. A valve as in claim 7 further comprising an adjusting means having a first end and being movably attached to said body such that said first end is engageable with said first end of said biasing means, said adjusting means being movable from a disengaged position, defined when said biasing means is spaced apart from said second end of said spool valve, to a fully engaged position defined as when said spool valve remains in said closed position when the first fluid impinges said first end surface of said spool valve.

* * * * *